(12) United States Patent
Tachibana et al.

(10) Patent No.: US 12,682,037 B2
(45) Date of Patent: Jul. 14, 2026

(54) INFORMATION PROCESSING DEVICE AND INFORMATION PROCESSING METHOD

(71) Applicant: Sony Semiconductor Solutions Corporation, Kanagawa (JP)

(72) Inventors: Kazutaka Tachibana, Kanagawa (JP); Tetsuo Yoshida, Kanagawa (JP); Harunaga Hiwatari, Kanagawa (JP); Haruki Satou, Kanagawa (JP); Akira Noguchi, Kanagawa (JP); Hiroshi Iwasaki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 121 days.

(21) Appl. No.: 18/712,226

(22) PCT Filed: Dec. 16, 2022

(86) PCT No.: PCT/JP2022/046505
§ 371 (c)(1),
(2) Date: May 21, 2024

(87) PCT Pub. No.: WO2023/132210
PCT Pub. Date: Jul. 13, 2023

(65) Prior Publication Data
US 2025/0013730 A1     Jan. 9, 2025

(30) Foreign Application Priority Data
Jan. 7, 2022     (JP) .................................. 2022-001916

(51) Int. Cl.
*H04L 41/16*          (2022.01)
*G06F 21/44*          (2013.01)

(52) U.S. Cl.
CPC .................................. *G06F 21/44* (2013.01)

(58) Field of Classification Search
CPC . H04L 9/32; G06F 21/44; G06F 21/52; G06F 21/54
(Continued)

(56) References Cited

U.S. PATENT DOCUMENTS

| 10,409,600 B1 | 9/2019 | Sierra | |
| 2012/0278732 A1* | 11/2012 | Lee | ....................... H04L 67/141 |
| | | | 715/752 |

(Continued)

FOREIGN PATENT DOCUMENTS

| JP | 2017518661 A | 7/2017 | |
| JP | 2020533683 A | 11/2020 | |
| WO | WO-2022182251 A1* | 9/2022 | ............ H04W 12/06 |

OTHER PUBLICATIONS

International Search Report (PCT/ISA/210), International Application No. PCT/JP2022/046505, dated Feb. 28, 2023.
(Continued)

*Primary Examiner* — Lan Dai T Truong
(74) *Attorney, Agent, or Firm* — Michael Best & Friedrich LLP

(57)          ABSTRACT

An information processing device according to an embodiment of the present disclosure is provided with a memory unit including a stack area, and an information processing unit. The information processing unit executes, after executing a return instruction to a specific address, a determination process configured to determine whether an instruction placed at the specific address is an authentication code verification instruction, and verifies, in a case where the instruction placed at the specific address is consequently determined as the authentication code verification instruction, match or mismatch of an authentication code by executing the authentication code verification instruction.

18 Claims, 2 Drawing Sheets

(58) Field of Classification Search
USPC ........................................................... 726/18
See application file for complete search history.

(56)                     References Cited

U.S. PATENT DOCUMENTS

| | | |
|---|---|---|
| 2016/0094552 A1 | 3/2016 | Durham |
| 2016/0171211 A1 | 6/2016 | Chen |
| 2022/0215382 A1* | 7/2022 | Chen ...................... G06Q 20/02 |
| 2023/0259605 A1* | 8/2023 | Larri .................... G06F 9/3004 |
| | | 726/18 |

OTHER PUBLICATIONS

Liljestrand, H. et al., PAC it up: Towards Pointer Integrity using ARM Pointer Authentication, The Proceedings of the 28th USENIX Security Symposium, Aug. 2019, pp. 177-194 2.2 ARM Pointer Authentication, 5 Design, 6 Implementation.

* cited by examiner

[ FIG. 1 ]
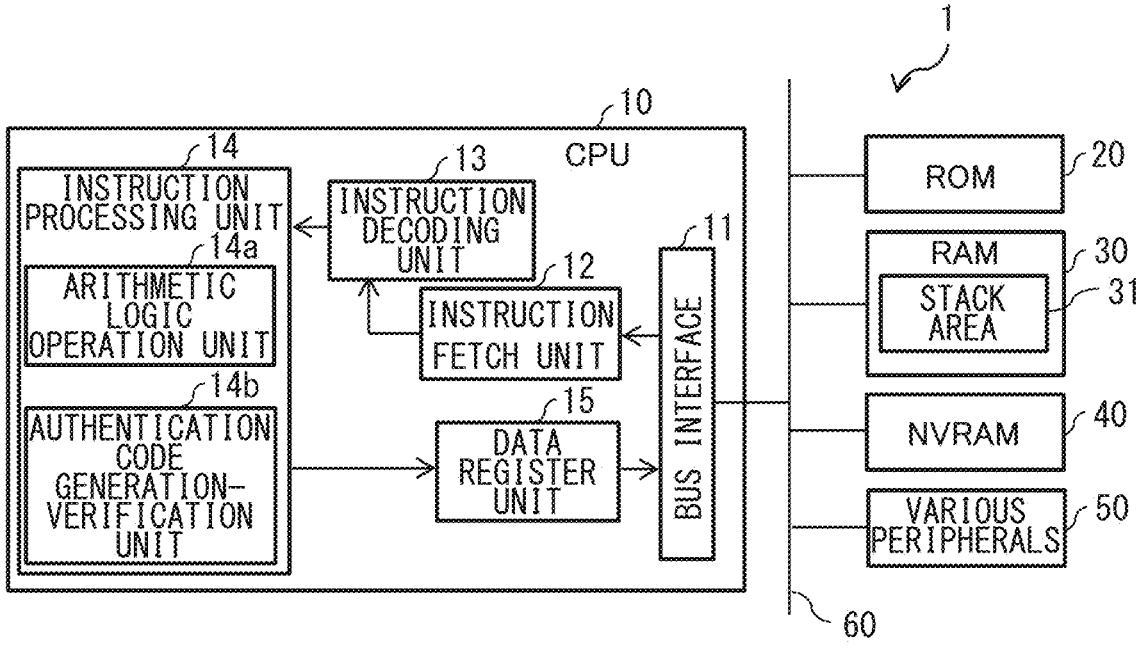
[ FIG. 2 ]
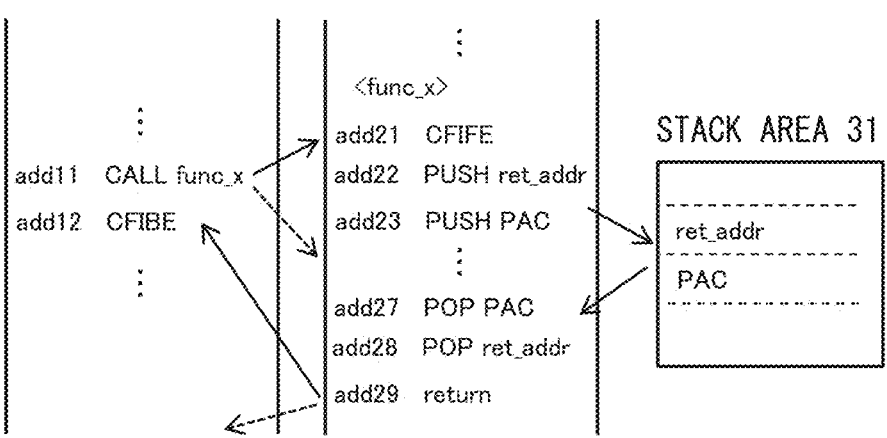

[ FIG. 3 ]
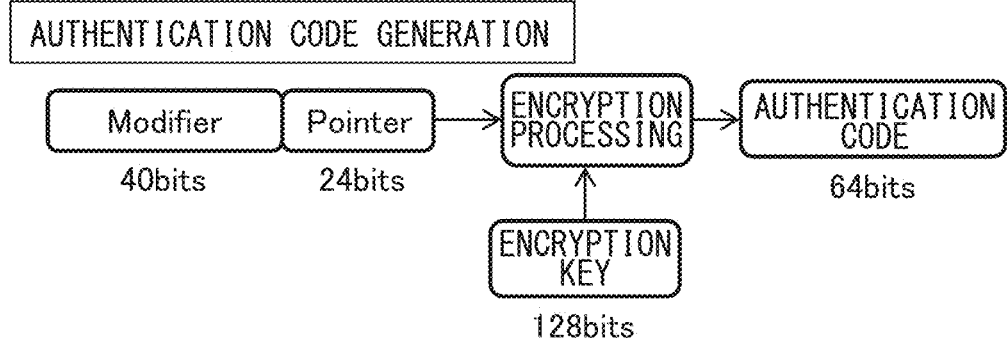
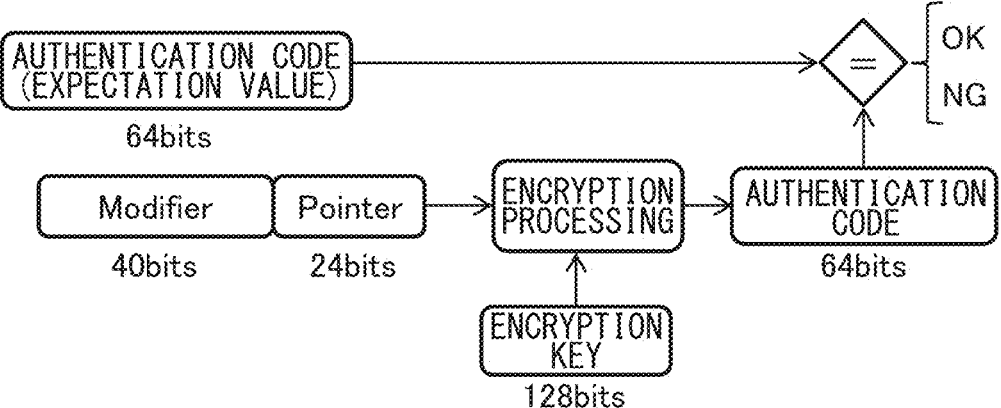

INFORMATION PROCESSING DEVICE AND INFORMATION PROCESSING METHOD

TECHNICAL FIELD

The present disclosure relates to an information processing device and an information processing method.

BACKGROUND ART

In recent years, with the popularization of communication networks, cyber attacks on information processing devices have been sophisticated and diversified, and there has been a number of reports pointing out vulnerabilities caused by malware, etc., aiming at improper software implementations. It is known that Return-Oriented Programming (ROP) and Jump-Oriented Programming (JOP) are typical forms of attack, and there have been demands that information processing devices should ensure the operation of software as intended.

CITATION LIST

Patent Literature

Patent Literature 1: U.S. patent Ser. No. 10/409,600

SUMMARY OF THE INVENTION

According to a method as described in Patent Literature 1, an authentication code corresponding to a return address is verified, and after confirming that the return address has not been changed, a return instruction is executed. However, according to this method, in a case where the return address is tampered aiming at a timing between the completion of verification of the authentication code and the beginning of execution of the return instruction, prevention of attack becomes impossible. Moreover, in a case where an authentication code verification instruction is skipped with a malicious intent, it is necessary to detect by any other means. Therefore, it is desirable to provide an information processing device and an information processing method, that make it possible to prevent, not only tampering of the return address, but also branching to an unintended and unauthorized address.

An information processing device according to one embodiment of the present disclosure is provided with a memory unit including a stack area, and an information processing unit. The information processing unit executes, after executing a return instruction to a specific address, a determination process configured to determine whether an instruction placed at the specific address is an authentication code verification instruction, and verifies, in a case where the instruction placed at the specific address is consequently determined as the authentication code verification instruction, match or mismatch of an authentication code by executing the authentication code verification instruction.

An information processing method according to one embodiment of the present disclosure is an information processing method in an information processing device provided with a memory unit including a stack area, and includes the following processing:

executing a return instruction to a specific address;
executing thereafter a determination process configured to determine whether an instruction placed at the specific address is an authentication code verification instruction; and verifying, in a case where the instruction placed at the specific address is consequently determined as the authentication code verification instruction, match or mismatch of an authentication code by executing the authentication code verification instruction.

In the information processing device and the information processing method according to one embodiment of the present disclosure, after executing the return instruction to the specific address, it is determined whether the instruction placed at the specific address is the authentication code verification instruction. In a case where it is consequently determined that the instruction placed at the specific address is the authentication code verification instruction, match or mismatch of the authentication code is verified by executing the authentication code verification instruction. Because of this, for example, in a case where an address of the stack area is tampered at a timing between the completion of verification of authentication code and the beginning of execution of the return instruction, it is consequently verified as being mismatched, making it possible to detect the tampering. Moreover, after the completion of return instruction, in a case where the authentication code verification instruction is skipped with a malicious intent, it is also possible to detect in a similar manner.

BRIEF DESCRIPTION OF DRAWING

FIG. 1 is a schematic diagram describing an overall configuration of an information processing device according to one embodiment of the present disclosure.

FIG. 2 is a schematic diagram illustrating a conceptual example of procedure for information processing performed by the information processing device of FIG. 1.

FIG. 3 are schematic diagrams illustrating conceptual examples of procedures for generation and verification of authentication code.

MODES FOR CARRYING OUT THE INVENTION

In the following, an embodiment of the present disclosure will be described in detail with reference to the drawings.
(Configuration)

A description will be given of an information processing device 1 according to one embodiment of the present disclosure. FIG. 1 is a schematic diagram describing an overall configuration of an information processing device 1. FIG. 2 is a schematic diagram illustrating a conceptual example of procedure for information processing performed by the information processing device 1. As illustrated in FIG. 1, the information processing device 1 is provided with a CPU (Central Processing Unit) 10, a ROM (Read Only Memory) 20, a RAM (Random Access Memory) 30, an NVRAM (Non Volatile RAM) 40, and various peripherals 50, for example.

The ROM 20 is a read-only memory. The data stored by the ROM 20 essentially stores, for example, fixed data, etc., among programs for executing various processing and parameters for arithmetic operation performed by the CPU 10.

The RAM 30 is a rewritable volatile memory. RAM 30 stores, for example, parameters, etc., that vary as appropriate in the execution of the CPU 10. The RAM 30 includes a stack area 31. The stack area 31 temporarily stores, for example, data necessary for calling a function in a program used in the execution of processing by the CPU 10.

The NVRAM 40 is a rewritable non-volatile memory. The NVRAM 40 stores, for example, data acquired via a communication unit 20, and a program for executing various processings at the CPU 10 (for example, a program including a function), etc.

The various peripherals 50 are various devices used in combination with the CPU 10. Examples of the various peripherals include an interrupt controller, a general-purpose timer, a watchdog timer, a communication interface such as for I2C/SPI/UART, an encryption processing block, and a random number generator, etc.

The CPU 10 executes a program, for example, read from the NVRAM 40 or the ROM 20. The CPU 10 includes a bus interface 11, an instruction fetch unit 12, an instruction decoding unit 13, an instruction processing unit 14, and a data register unit 15, for example.

The bus interface 11 receives, via a bus 60, data from the ROM 20, the RAM 30, the NVRAM 40, and the various peripherals 50, and outputs the data to the instruction fetch unit 12. Data outputted from the instruction processing unit 14 is transmitted, by the bus interface 12 and via the bus 60, to the ROM 20, the RAM 30, the NVRAM 40, and the various peripherals 50.

The instruction fetch unit 12 acquires, through the bus interface 11, instructions from the ROM 20, the RAM 30, the NVRAM 40, and the various peripherals 50, and outputs the instructions to the instruction decoding unit 13. The instruction decoding unit 13 decodes contents of the instruction acquired from the instruction fetch unit 12, and outputs the contents thereof to the instruction processing unit 14. The data register unit 15 outputs data, acquired from the instruction processing unit 14, to the bus interface 11.

The instruction processing unit 14 executes contents of the instruction acquired from the instruction decoding unit 13. The instruction processing unit 14 includes an arithmetic logic operation unit 14a, and an authentication code generation-verification unit 14b, for example.

The instruction processing unit 14 executes, as illustrated in FIG. 2, a call instruction (CALL) of a function (func_x), for example. With this execution, the instruction processing unit 14 calls (reads) the function (func_x). Specifically, the instruction processing unit 14 acquires a branch target address and a return address specified by the call instruction (CALL) of the mathematical function (func_x). The return address is an address (a pointer) subsequent to the call instruction (CALL) of the mathematical function (func_x), which is presented as add12 in FIG. 2.

The instruction processing unit 14 executes an instruction placed at the branch target address specified by the call instruction (CALL) of the mathematical function (func_x). Normally, the branch target address has been set as a start address of function. In that case, the instruction processing unit 14 executes an instruction placed at the start address of function. In the present embodiment, an authentication code generation instruction (CFIFE) is to be placed at the start address of function. For that reason, when the function (func_x) is called, the authentication code generation-verification unit 14b initially confirms whether the authentication code generation instruction (CFIFE) is read, which makes it possible to determine whether the branch target address specified by the call instruction (CALL) of the mathematical function (func_x) is the start address of the mathematical function (func_x). This means that, in the present embodiment, the authentication code generation instruction (CFIFE) also serves as a branch target. As explained above, the authentication code generation-verification unit 14b executes a determination process for determining whether the instruction placed at the branch target address specified by the call instruction (CALL) of the mathematical function (func_x) is the authentication code generation instruction (CFIFE).

Note that, at the time of calling of the mathematical function (func_x) by the instruction processing unit 14, in a case where an instruction different from the authentication code generation instruction (CFIFE) is read initially, this means that the branch target address specified by the call instruction (CALL) of the mathematical function (func_x) is not the start address of the mathematical function (a dashed arrow in FIG. 2). Accordingly, in that case, the authentication code generation-verification unit 14b determines that the branch target address specified by the call instruction (CALL) of the mathematical function (func_x) is not a correct value, and interrupts a subsequent processing.

The instruction processing unit 14 outputs, in accordance with the authentication code generation instruction (CFIFE), the return address specified by the call instruction (CALL) of the mathematical function (func_x), to the authentication code generation-verification unit 14b. Upon acquiring the return address from the instruction processing unit 14, the authentication code generation-verification unit 14b generates an authentication code by using the acquired return address. The authentication code generation-verification unit 14b generates, as illustrated in FIG. 3, data before being encoded (64-bit input data), for example, by coupling a 40-bit modifier as being a higher-bit, with a 24-bit return address (Pointer). Subsequently, the authentication code generation-verification unit 14b generates a 64-bit authentication code, by encoding the generated 64-bit input data with the use of a 128-bit encryption key, for example. The authentication code generation-verification unit 14b outputs the generated 64-bit authentication code, to a register internally provided in the instruction processing unit 14.

The instruction processing unit 14 saves (stores) the return address in the stack area 31, by executing a store instruction (PUSH ret_addr) placed at an address subsequent to the authentication code generation instruction (CFIFE). The instruction processing unit 14 further saves (stores) the authentication code (for example, the 64-bit authentication code) in the stack area 31, by executing a store instruction (PUSH PAC) placed at an address subsequent to the store instruction (PUSH ret_addr).

After executing a series of instructions described in the function (func_x), the instruction processing unit 14 reads the return address saved (stored) in the stack area 31, by executing a read instruction (POP PAC). The instruction processing unit 14 further reads the authentication code (for example, the 64-bit authentication code) saved (stored) in the stack area 31, by executing a read instruction (POP ret_addr) placed at an address subsequent to the read instruction (POP PAC).

Hereinafter, the return address while being saved (stored) in the stack area 31 will be referred to as a before-saved return address before saving, and the return address read from the stack area 31 will be referred to as an after-saved return address. In a case where the stack area 31 has not been tampered, the after-saved return address is equal to the before-saved return address. In a case where the stack area 31 has been tampered, there is a possibility that the after-saved return address is different from the before-saved return address.

After reading the return address and the authentication code from the stack area 31, the instruction processing unit 14 executes a return instruction. The instruction processing unit 14 executes the return instruction by using the return address read from the stack area 31.

After executing the return instruction to the return address (a specific address), the instruction processing unit 14 executes an instruction placed in the return address read from the stack area 31. Normally, the return address read from the stack area 31 is an address subsequent to the call instruction (CALL) of the mathematical function (func_x). In that case, the instruction processing unit 14 executes an instruction placed at an address subsequent to the call instruction (CALL) of the mathematical function (func_x). In the present embodiment, an authentication code verification instruction (CFIBE) is to be placed at an address subsequent to the call instruction (CALL) of the mathematical function (func_x). For that reason, after executing the return instruction, the authentication code generation-verification unit 14*b* confirms whether a PAC verification instruction (CFIBE) is read, which makes it possible to determine whether the return address read from the stack area 31 is the address subsequent to the call instruction (CALL) of the mathematical function (func_x). As described above, the authentication code generation-verification unit 14*b* executes a determination process configured to determine whether the instruction, placed at the return address and read from the stack area 31, is the authentication code verification instruction (CFIBE).

Note that, after executing the return instruction by the instruction processing unit 14, in a case where an instruction different from the authentication code verification instruction (CFIBE) is read initially, this means that the return address read from the stack area 31 is not the address subsequent to the call instruction (CALL) of the mathematical function (func_x) (a dashed arrow in FIG. 2). Accordingly, in that case, the authentication code generation-verification unit 14*b* determines that the return address of the stack area 31 has been tampered, and it is allowed to interrupt a subsequent processing.

In a case where the instruction, placed at the return address read from the stack area 31, is the authentication code verification instruction (CFIBE), then, the instruction processing unit 14 outputs, in accordance with the authentication code verification instruction (CFIBE), the authentication code read from the stack area 31, and the address of the authentication code verification instruction (CFIBE), to the authentication code generation-verification unit 14*b*. Upon the acquisition from the instruction processing unit 14, of the authentication code read from the stack area 31, and of the address of the authentication code verification instruction (CFIBE), the authentication code generation-verification unit 14*b* verifies whether the acquired authentication code matches with or mismatches from the authentication code generated from the acquired address of the authentication code verification instruction (CFIBE). A method of generating the authentication code by using the address of the authentication code verification instruction (CFIBE) is similar, for example, to the method of generating the authentication code as illustrated in FIG. 3 described above. In a case where it is consequently verified as being matched, the instruction processing unit 14 executes an instruction placed at an address subsequent to the authentication code verification instruction (CFIBE). By contrast, in a case where it is consequently verified as being mismatched, the authentication code generation-verification unit 14*b* determines that the return address of the stack area 31 has been tampered, and interrupts a subsequent processing.

Effects

Next, effects of the information processing device 1 will be explained.

In recent years, with the popularization of communication networks, cyber attacks on information processing devices have been sophisticated and diversified, and there has been a number of reports pointing out vulnerabilities caused by malware, etc., aiming at improper software implementations. It is known that Return-Oriented Programming (ROP) and Jump-Oriented Programming (JOP) are typical forms of attack, and there are demands that information processing devices should ensure the operation of software as intended.

According to a method as described in Patent Literature 1, an authentication code corresponding to a return address is verified, and after confirming that the return address has not been changed, a return instruction is executed. However, according to this method, in a case where the return address is tampered aiming at a timing between the end of completion of verification of the authentication code and the beginning of execution of the return instruction, prevention of attack becomes impossible. Moreover, in a case where an authentication code verification instruction is skipped with a malicious intent, it is necessary to detect by any other means.

Moreover, according to a method in a Non-Patent Literature 1 as described below, a dedicated instruction (ENDBR) is placed at a start of function, and at the time of an indirect call instruction, it is checked that branching to this ENDBR is surely made. With this method, a place of a branch target, having a risk of being harmed by a successful attack of changing the branch target of the indirect call instruction, is limited to the place at which the ENDBR exists, and because of this configuration, difficulty of attack becomes considerably high. However, according to this method, since an ENDBR having no relevance to the processing of function is placed at the start of function, there is a possibility of occurrence of an overhead of code size or processing performance.

Non-Patent Literature 1 https://lpc.events/event/2/contributions/147/attachments/72/83/CET-LPC-2018.pdf

On the other hand, according to the present embodiment, after executing the return instruction, it is determined whether the instruction, placed at the return address read from the stack area 31, is the authentication code verification instruction (CFIBE) corresponding to the return address. In a case of a resulting determination that the instruction placed at a specific address be the authentication code verification instruction (CFIBE), match or mismatch of the authentication code is verified by executing the authentication code verification instruction (CFIBE). Because of this, for example, in a case where the return address of the stack area is tampered at a timing between the completion of verification of authentication code and the beginning of execution of the return instruction, it is consequently verified as being mismatched, which makes it possible to detect the tampering. Moreover, after the completion of return instruction, in a case where the authentication code verification instruction is skipped with a malicious intent, it is possible to detect in a similar manner. This allows prevention of attack against the return address.

In the present embodiment, in accordance with the authentication code verification instruction (CFIBE), it is verified whether the authentication code, read from the stack area 31, matches with or mismatches from the authentication code generated from the address of the authentication code verification instruction (CFIBE). Because of this, for example, after executing the return instruction, in a case where return address of the stack area has been tampered, it is consequently verified as being mismatched, which makes it possible to detect the tampering. This allows prevention of attack against the return address.

In the present embodiment, it is determined whether the instruction, placed at the branch target address specified by the call instruction (CALL) of the mathematical function (func_x), is the authentication code generation instruction (CFIFE). This means that, since the authentication code generation instruction (CALL) also serves as the branch target, as compared with the case of placing the authentication code generation instruction (CALL) separately from the branch target, it is possible to prevent increasing overhead of function.

Although the technology according to the present disclosure has been explained above with reference to the embodiment, the technology according to the present disclosure is not limited to the above-described embodiment, and is modifiable in a variety of ways. For example, according to the embodiment as described above, it is envisaged that the software is described in C language, but it is possible to describe the software in any language other than C language.

It should be noted that the effects described herein are for mere example purposes. The effects of the present embodiment is not limited to the effects described herein. The present embodiment may have any effects other than those described herein.

Furthermore, the present embodiment may include configurations, for example, as described below.

(1)

An information processing device including:

a memory unit including a stack area; and an information processing unit, in which the information processing unit executes, after executing a return instruction to a specific address, a determination process configured to determine whether an instruction placed at the specific address is an authentication code verification instruction, and verifies, in a case where the instruction placed at the specific address is consequently determined as the authentication code verification instruction, match or mismatch of an authentication code by executing the authentication code verification instruction.

(2)

The information processing device according to (1), in which the information processing unit executes the return instruction by using the specific address read from the stack area.

(3)

The information processing device according to (2), in which the information processing unit verifies, in accordance with the authentication code verification instruction, match or mismatch between a first authentication code read from the stack area, and a second authentication code generated from an address of the authentication code verification instruction.

(4)

The information processing device according to (3), in which the information processing unit executes a mathematical function call instruction, following which the information processing unit executes the return instruction after, executing a store instruction that stores, in the stack area, a return address acquired with the execution of mathematical function call instruction and a third authentication code generated by using the return address; and executing a read instruction that reads data from an address at a place storing the return address in the stack area and data from an address at a place storing the third authentication code in the stack area.

(5)

The information processing device according to (4), in which the information processing unit executes a determination process configured to determine whether an instruction placed at a start address of the mathematical function is an authentication code generation instruction.

(6)

The information processing device according to (5), in which the information processing device generates the third authentication code by using the return address, in accordance with the authentication code generation instruction.

(7)

An information processing method, in an information processing device provided with a memory unit including a stack area, including, executing a return instruction to a specific address;

executing thereafter a determination process configured to determine whether an instruction placed at the specific address is an authentication code verification instruction; and verifying, in a case where the instruction placed at the specific address is consequently determined as the authentication code verification instruction, match or mismatch of an authentication code by executing the authentication code verification instruction.

(8)

The information processing method according (7), further including executing the return instruction by using the specific address read from the stack area.

(9)

The information processing method according to (8), further including verifying, in accordance with the authentication code verification instruction, match or mismatch between a first authentication code read from the stack area, and a second authentication code generated from an address of the authentication code verification instruction.

(10)

The information processing method according to (9), further including:

executing a mathematical function call instruction; and executing the return instruction, after executing a store instruction that stores, in the stack area, a return address acquired with the execution of mathematical function call instruction and a third authentication code generated by using the return address, and executing a read instruction that reads data from an address at a place storing the return address in the stack area and data from an address at a place storing the third authentication code in the stack area.

(11)

The information processing method according to (10), further including executing a determination process configured to determine whether an instruction placed at a start address of the mathematical function is an authentication code generation instruction.

(12)

The information processing method according to (11), further including generating the third authentication code by using the return address, in accordance with the authentication code generation instruction.

In the information processing device and the information processing method according to one embodiment of the present disclosure, after executing the return instruction to the specific address, it is determined whether the instruction placed at the specific address is the authentication code verification instruction. In a case where it is consequently determined that the instruction placed at the specific address is the authentication code verification instruction, match or mismatch of the authentication code is verified by executing the authentication code verification instruction. Because of this, for example, in a case where an address of the stack area is tampered at a timing between the completion of verification of authentication code and the beginning of execution of the return instruction, it is consequently verified as being mismatched, making it possible to detect the tampering. Moreover, after the completion of return instruction, in a case where the authentication code verification instruction is skipped with a malicious intent, it is also possible to detect in a similar manner. Therefore, it is possible to prevent, not only tampering of return address, but also branching to an unintended and unauthorized address.

The present embodiment is not limited to the embodiment described above, and various modifications are possible without departing from the scope of the present disclosure. Furthermore, the effects described herein are merely illustrative and not restrictive, and other effects may be present as well.

This application claims priority based on Japanese Patent Application No. 2022-001916 filed on Jan. 7, 2022 with Japan Patent Office, the entire contents of which are incorporated in this application by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing device comprising:
a memory unit including a stack area; and
an information processing unit, wherein
   the information processing unit executes, after executing a return instruction to a specific address, a determination process for determining whether an instruction placed at the specific address is an authentication code verification instruction, and verifies, in a case where the instruction placed at the specific address is consequently determined as the authentication code verification instruction, match or mismatch of an authentication code by executing the authentication code verification instruction, and
   wherein determining whether the instruction placed at the specific address is an authentication code verification instruction occurs after completion of the return instruction and prior to execution of another instruction at the specific address.

2. The information processing device according to claim 1, wherein
   the information processing unit executes the return instruction by using the specific address read from the stack area.

3. The information processing device according to claim 2, wherein
   the information processing unit verifies, in accordance with the authentication code verification instruction, match or mismatch between a first authentication code read from the stack area, and a second authentication code generated from an address of the authentication code verification instruction.

4. The information processing device according to claim 3, wherein
   the information processing unit executes a mathematical function call instruction, following which the information processing unit executes the return instruction after: executing a store instruction that stores, in the stack area, a return address acquired with the execution of mathematical function call instruction and a third authentication code generated by using the return address; and executing a read instruction that reads data from an address at a place storing the return address in the stack area and data from an address at a place storing the third authentication code in the stack area.

5. The information processing device according to claim 4, wherein
   the information processing unit executes a determination process configured to determine whether an instruction placed at a start address of the mathematical function is an authentication code generation instruction.

6. The information processing device according to claim 5, wherein
   the information processing device generates the third authentication code by using the return address, in accordance with the authentication code generation instruction.

7. An information processing method, in an information processing device provided with a memory unit including a stack area, the information processing method comprising:
   executing a return instruction to a specific address;
   after executing the return instruction, determining whether an instruction placed at the specific address is an authentication code verification instruction; and
   verifying, in a case where the instruction placed at the specific address is consequently determined as the authentication code verification instruction, match or mismatch of an authentication code by executing the authentication code verification instruction,
   wherein determining whether the instruction placed at the specific address is an authentication code verification instruction occurs after completion of the return instruction and prior to execution of another instruction at the specific address.

8. The information processing method according to claim 7, further comprising:
   executing the return instruction by using the specific address read from the stack area.

9. The information processing method according to claim 8, further comprising:
   verifying, in accordance with the authentication code verification instruction, match or mismatch between a first authentication code read from the stack area, and a second authentication code generated from an address of the authentication code verification instruction.

10. The information processing method according to claim 9, further comprising:
   executing a mathematical function call instruction; and
   executing the return instruction, after
   executing a store instruction that stores, in the stack area, a return address acquired with the execution of mathematical function call instruction and a third authentication code generated by using the return address, and
   executing a read instruction that reads data from an address at a place storing the return address in the stack area and data from an address at a place storing the third authentication code in the stack area.

11. The information processing method according to claim 10, further comprising:
   executing a determination process configured to determine whether an instruction placed at a start address of the mathematical function is an authentication code generation instruction.

12. The information processing method according to claim 11, further comprising:

generating the third authentication code by using the return address, in accordance with the authentication code generation instruction.

13. A non-transitory computer readable medium storing a program for information processing in a device provided with a memory unit including a stack area, the program being executable by a processor to perform operations comprising:

executing a return instruction to a specific address;

after executing the return instruction, determining whether an instruction placed at the specific address is an authentication code verification instruction; and verifying, in a case where the instruction placed at the specific address is consequently determined as the authentication code verification instruction, match or mismatch of an authentication code by executing the authentication code verification instruction, wherein determining whether the instruction placed at the specific address is an authentication code verification instruction occurs after completion of the return instruction and prior to execution of another instruction at the specific address.

14. The non-transitory computer readable medium according to claim 13, further comprising:

executing the return instruction by using the specific address read from the stack area.

15. The non-transitory computer readable medium according to claim 14, further comprising:

verifying, in accordance with the authentication code verification instruction, match or mismatch between a first authentication code read from the stack area, and a second authentication code generated from an address of the authentication code verification instruction.

16. The non-transitory computer readable medium according to claim 15, further comprising:

executing a mathematical function call instruction; and executing the return instruction, after executing a store instruction that stores, in the stack area, a return address acquired with the execution of mathematical function call instruction and a third authentication code generated by using the return address, and executing a read instruction that reads data from an address at a place storing the return address in the stack area and data from an address at a place storing the third authentication code in the stack area.

17. The non-transitory computer readable medium according to claim 16, further comprising:

executing a determination process configured to determine whether an instruction placed at a start address of the mathematical function is an authentication code generation instruction.

18. The non-transitory computer readable medium according to claim 17, further comprising:

generating the third authentication code by using the return address, in accordance with the authentication code generation instruction.

\* \* \* \* \*